(12) United States Patent
Tsutsui et al.

(10) Patent No.: US 8,880,310 B2
(45) Date of Patent: Nov. 4, 2014

(54) CONTROL DEVICE OF AUTOMATIC TRANSMISSION

(75) Inventors: Hiroshi Tsutsui, Aichi ken (JP); Yutaka Teraoka, Anjo (JP); Masatake Ichikawa, Kariya (JP); Shoji Omitsu, Toyota (JP)

(73) Assignee: Aisin AW Co., Ltd., Aichi-ken (JP)

(*) Notice: Subject to any disclaimer, the term of this patent is extended or adjusted under 35 U.S.C. 154(b) by 0 days.

(21) Appl. No.: 13/076,051

(22) Filed: Mar. 30, 2011

(65) Prior Publication Data

US 2011/0251767 A1    Oct. 13, 2011

(30) Foreign Application Priority Data

Mar. 31, 2010 (JP) ................................. 2010-082528
Mar. 28, 2011 (WO) .................. PCT/JP2011/057666

(51) Int. Cl.
| | | |
|---|---|---|
| G06F 19/00 | (2011.01) |
| F16D 13/48 | (2006.01) |
| B60W 10/00 | (2006.01) |
| F16D 48/08 | (2006.01) |
| F16D 48/06 | (2006.01) |
| F16H 61/20 | (2006.01) |

(52) U.S. Cl.
CPC .............. F16D 48/066 (2013.01); F16D 48/08 (2013.01); F16H 2312/022 (2013.01); F16D 2500/501 (2013.01); F16H 61/20 (2013.01); F16D 2500/1087 (2013.01); F16D 2500/70652 (2013.01); F16D 2500/50669 (2013.01); F16D 2500/70414 (2013.01)
USPC .............................. 701/67; 192/70.28; 477/86

(58) Field of Classification Search
CPC ....... F16D 25/00; F16D 25/06; F16D 25/061; F16D 25/062; F16D 25/063; F16D 25/0635; F16D 25/0638; F16D 25/064; F16D 25/065
USPC .................. 701/67; 192/70.28; 477/70, 86, 93
See application file for complete search history.

(56) References Cited

U.S. PATENT DOCUMENTS

| | | | | |
|---|---|---|---|---|
| 4,653,622 | A | | 3/1987 | Miyake |
| 5,393,275 | A | * | 2/1995 | Okada et al. ..................... 477/81 |
| 5,800,308 | A | | 9/1998 | Tsutsui et al. |
| 5,813,943 | A | * | 9/1998 | Kousaka et al. ............... 477/156 |
| 5,911,295 | A | * | 6/1999 | Itonaga et al. ............. 192/70.28 |

(Continued)

FOREIGN PATENT DOCUMENTS

| | | |
|---|---|---|
| CN | 1873248 A | 12/2006 |
| JP | 60-136644 A | 7/1985 |

(Continued)

*Primary Examiner* — Fadey Jabr
*Assistant Examiner* — Aaron L Troost
(74) *Attorney, Agent, or Firm* — Sughrue Mion, PLLC (57) ABSTRACT

If it is determined that a D range is in use and determined that a vehicle is stopped, neutral control means (25) commands and controls an engagement pressure of a clutch (C-1) so as to achieve a state in which a piston of the clutch (C-1) contacts a clutch drum by a biasing force of a spring, and a state in which oil fills an oil passage from a linear solenoid valve (SLC1) to a hydraulic oil chamber and fills the hydraulic oil chamber. There is thus no drag loss in the clutch (C-1) during a neutral control, and the same fuel economy as when, for example, a manual shift to the neutral range is made can be achieved during the neutral control.

3 Claims, 9 Drawing Sheets

(56) References Cited

U.S. PATENT DOCUMENTS

| | | | |
|---|---|---|---|
| 6,508,337 B1 * | 1/2003 | Esper | 188/71.5 |
| 7,445,107 B2 * | 11/2008 | Kawamoto et al. | 192/85.63 |
| 7,769,516 B2 | 8/2010 | Kondo et al. | |
| 7,861,838 B2 | 1/2011 | Ohtake et al. | |
| 2001/0003322 A1 * | 6/2001 | Kon et al. | 192/3.58 |
| 2004/0111204 A1 | 6/2004 | Kojima et al. | |
| 2005/0064988 A1 | 3/2005 | Hasegawa et al. | |
| 2008/0172161 A1 * | 7/2008 | Kondo et al. | 701/66 |
| 2009/0023552 A1 * | 1/2009 | Ohtake et al. | 477/93 |
| 2009/0143949 A1 * | 6/2009 | Fukaya et al. | 701/67 |

FOREIGN PATENT DOCUMENTS

| | | |
|---|---|---|
| JP | 05-302669 A | 11/1993 |
| JP | 08-303568 A | 11/1996 |
| JP | 9-32917 A | 2/1997 |
| JP | 2001-165290 A | 6/2001 |
| JP | 2001-349421 A | 12/2001 |
| JP | 2004-100781 A | 4/2004 |
| JP | 2004-190756 A | 7/2004 |
| JP | 2005-098353 A | 4/2005 |
| JP | 2006250287 A | 9/2006 |
| JP | 2009024761 A | 2/2009 |

* cited by examiner

|     | C-1 | C-2 | C-3 | B-1 | B-2 | F-1 |
|-----|-----|-----|-----|-----|-----|-----|
| P   |     |     |     |     |     |     |
| REV |     |     | O   |     | O   |     |
| N   |     |     |     |     |     |     |
| 1ST | O   |     |     |     | (O) | O   |
| 2ND | O   |     |     | O   |     |     |
| 3RD | O   |     | O   |     |     |     |
| 4TH | O   | O   |     |     |     |     |
| 5TH |     | O   | O   |     |     |     |
| 6TH |     | O   |     | O   |     |     |

* (O): ENGINE BRAKE IN OPERATION

CONTROL DEVICE OF AUTOMATIC TRANSMISSION

TECHNICAL FIELD

The present invention relates to a control device of an automatic transmission installed in a vehicle, for example. More specifically, the present invention relates to a control device of an automatic transmission that, while the vehicle is stopped in a driving range, maintains a neutral state by controlling a clutch engaged at start off.

BACKGROUND ART

There is a conventionally known automatic transmission installed in a vehicle or the like that performs a so-called neutral control. In the neutral control, when the vehicle running in a driving range is stopped by a foot brake or the like, the engagement of a clutch (e.g. C-1) that accomplishes power transmission from an engine to a drive wheel is relaxed to achieve a substantially neutral state (see Patent Document 1). A control device for an automatic transmission according to Patent Document 1 increases the engagement pressure of the clutch by a preset pressure if a clutch drag state is determined, and decreases the engagement pressure of the clutch by the preset pressure if a clutch slip state (power transmission state) is determined, thereby maintaining the clutch in a state immediately prior to the slip state (immediately prior to performing power transmission).

In cases where the neutral control that achieves this type of drag state (state immediately before the slip state) is performed, when the vehicle is stopped, torque converter drag (creep torque transmission) can be suppressed to improve fuel economy and the transmission of engine vibrations to the vehicle body can also be suppressed; meanwhile, when the vehicle starts off, the clutch can be immediately engaged to secure a power transmission response at start off and ensure that the driver and others do not sense a delay in the transmission of drive power.

CITATIONS OF RELATED ART

Patent Documents

Patent Document 1: Japanese Patent Application Publication No. JP-A-H09-32917

DISCLOSURE OF THE INVENTION

Problem to be Solved by the Invention

To control the engagement pressure of the clutch, a conventional hydraulic control device for an automatic transmission uses a control pressure that is controlled by a linear solenoid valve to drive and control a control valve, and adjusts a line pressure through the control valve, thus generating the engagement pressure. Due to recent improvements in the output performance of linear solenoid valves, it is now possible to use the linear solenoid valve to directly adjust the line pressure and generate the engagement pressure of the clutch, thus dramatically improving a response that controls the clutch state described above.

Environmental and other issues have led to calls in recent years for even better vehicle fuel economy, in other words, even greater automatic transmission efficiency. And there is still room for further improvements to fuel economy, given that even with the neutral control as described in Patent Document 1 there is still drag loss in the clutch while the vehicle is stopped. Further, if the clutch is fully disengaged in the neutral control (if the engagement pressure is set to zero), a delay in clutch engagement when the driver performs a start-off operation may still occur even with the improved output performance of the linear solenoid valve, thus giving the driver a sense of incongruity.

It is an object of the present invention to provide a control device of an automatic transmission that executes a neutral control while a vehicle is stopped in a driving range, and enables a further improvement to fuel economy.

Means for Solving the Problem

The present invention (see FIGS. 1 to 9, for example) is a control device (1) of an automatic transmission (3) that commands and controls a solenoid valve (SLC1) capable of adjusting and outputting an engagement pressure ($P_{C1}$) to be delivered to a hydraulic oil chamber (46) of a hydraulic servo (40) of a clutch (C-1) that is engaged at start off. The control device (1) is characterized by including: range determination means (21) for determining a shift range that includes a driving range; vehicle stop determination means (22) for determining when a vehicle is stopped; and neutral control means (25) for executing a neutral control that, when it is determined that the driving range is in use and determined that the vehicle is stopped, commands and controls the engagement pressure ($P_{C1}$) so as to achieve a state in which a piston (43) of the clutch (C-1) contacts a clutch drum (42) by a biasing force of a spring (45), and a state in which oil fills an oil passage (50) from the solenoid valve (SLC1) to the hydraulic oil chamber (46) of the hydraulic servo (40) of the clutch (C-1) and fills the hydraulic oil chamber (46) of the hydraulic servo (40) of the clutch (C-1).

Further, the present invention (see FIGS. 1 to 9, for example) is characterized by further including: start-off intent operation detection means (23) for detecting an operation that indicates an intent to start off the vehicle; fast-fill control means (27) for executing a fast-fill control that, when the operation that indicates an intent to start off the vehicle is detected, temporarily increases a hydraulic pressure command value for the engagement pressure ($P_{C1}$) so as to set the hydraulic servo (40) of the clutch (C-1) in a state more toward an engagement side than at a stroke end; and engagement control means (26) for performing an engagement control of the clutch (C-1) subsequent to the fast-fill control.

In addition, the present invention (see FIGS. 1, 7, 8, and 9, for example) is characterized in that the fast-fill control means (27) sets a magnitude of a hydraulic pressure command value ($P_{C1\text{-}FF}$) for the engagement pressure ($P_{C1}$) in the fast-fill control, based on the hydraulic pressure command value (i.e., $P_{C1\text{-}LOW}$) for the engagement pressure ($P_{C1}$) that is commanded and controlled by the neutral control means (25) and a time (TA) that said hydraulic pressure command value is continued.

Moreover, the present invention (see FIGS. 1, 7, 8, and 9, for example) is characterized by further including oil temperature detection means (35) for detecting an oil temperature, wherein the fast-fill control means (27) sets a time (TB) for executing the fast-fill control based on the oil temperature.

Note that the above reference numerals in parentheses are only used to reference the drawings and to aid in understanding the invention, and do not exert any influence on the constitution described in the claims.

Effects of the Invention

According to claim 1 of the present invention, when it is determined that a D range is in use and also determined that a vehicle is stopped, neutral control means commands and controls such that an engagement pressure is set so as to achieve a state in which a piston of a clutch contacts a clutch drum by a biasing force of a spring, and a state in which oil fills an oil passage from a linear solenoid valve to a hydraulic oil chamber and fills the hydraulic oil chamber. There is thus no drag loss in the clutch during a so-called neutral control, and the same fuel economy as when, for example, a manual shift to a neutral range is made can be achieved.

According to claim 2 of the present invention, if an operation that indicates the driver's intent to start off the vehicle is detected, fast-fill control means executes a fast-fill control that temporarily increases a hydraulic pressure command value for the engagement pressure, and sets the hydraulic servo of the clutch more toward an engagement side than at the stroke end. Therefore, coupled with the response of a solenoid valve to increase the engagement pressure, a delay in engagement of the clutch when the driver performs a start-off operation can be suppressed so that the driver does not experience a sense of incongruity.

According to claim 3 of the present invention, based on the hydraulic pressure command value for the engagement pressure that is commanded and controlled by the neutral control means and a time that the hydraulic pressure command value is maintained, the fast-fill control means sets the magnitude of a hydraulic pressure command value in the fast-fill control. That is, the hydraulic pressure control state of the clutch (piston stroke state of the hydraulic servo) at the end of the neutral control is predicted, and the fast-fill control can be executed in a form that reflects the prediction. It is thus possible to perform a fast-fill control that more accurately sets the clutch to a state immediately prior to engagement, so that engagement shock and engagement delay can be avoided.

According to claim 4 of the present invention, the fast-fill control means sets a time for executing the fast-fill control in accordance with an oil temperature. Therefore, a precise fast-fill control that considers oil viscosity can be executed to more accurately set the clutch to a state immediately prior to engagement, thus suppressing engagement shock and engagement delay.

BEST MODE FOR CARRYING OUT THE INVENTION

An embodiment of the present invention will be described below with reference to FIGS. 1 to 9.

First, the overall configuration of an automatic transmission 3 that can apply the present invention will be explained with reference to FIG. 2. As illustrated in FIG. 2, the automatic transmission 3 is well suited for use in a front-engine, front-wheel-drive (FF) vehicle, and has an input shaft 8 whereby the automatic transmission can be connected to an engine (E/G) 2 (see FIG. 1). A torque converter (T/C) 4 and an automatic speed change mechanism 5 are also provided centered in the axial direction of the input shaft 8.

The torque converter 4 has a pump impeller 4a that is connected to the input shaft 8 of the automatic transmission 3, and a turbine runner 4b to which the rotation of the pump impeller 4a is transmitted via a working fluid. The turbine runner 4b is connected to an input shaft 10 of the automatic speed change mechanism 5, which is coaxially disposed with the input shaft 8. Also, the torque converter 4 is provided with a lock-up clutch 7. Engagement of the lock-up clutch 7 directly transmits the rotation of the input shaft 8 of the automatic transmission 3 to the input shaft 10 of the automatic speed change mechanism 5.

The automatic speed change mechanism 5 is provided with a planetary gear SP and a planetary gear unit PU, which are both on the input shaft 10. The planetary gear SP is a so-called single pinion planetary gear that includes a sun gear S1, a carrier CR1, and a ring gear R1, wherein the carrier CR1 has a pinion P1 that meshes with the sun gear S1 and the ring gear R1.

The planetary gear unit PU includes, as four rotating elements, a sun gear S2, a sun gear S3, a carrier CR2, and a ring gear R2. The planetary gear unit PU is a so-called Ravigneaux type planetary gear in which a long pinion PL that meshes with the sun gear S2 and the ring gear R2 and a short pinion PS that meshes with the sun gear S3 both mesh with the carrier CR2.

The sun gear S1 of the planetary gear SP is connected to and held stationary by a boss portion that is integratedly fixed to a transmission case 9. The rotation of ring gear R1 (referred to as "input rotation" below) is identical to the rotation of the input shaft 10. The stationary sun gear S1 and the input rotation of the ring gear R1 cause the carrier CR1 to do deceleration rotation that decelerates the input rotation. The carrier CR1 is connected to a clutch C-1 and a clutch C-3.

The sun gear S2 of the planetary gear unit PU is connected to a brake B-1 formed from a hand brake and held stationary with respect to the transmission case. The sun gear S2 is also connected to the clutch C-3, and can be input with the deceleration rotation of the carrier CR1 through the clutch C-3. The sun gear S3 is connected to the clutch C-1, and can be input with the deceleration rotation of the carrier CR1.

The carrier CR2 is connected to a clutch C-2 into which the rotation of the input shaft 10 is input and through which the input rotation is input to the carrier CR2. The carrier CR2 is also connected to a one-way clutch F-1 and a brake B-2. The rotation that is input through the one-way clutch F-1 is restricted to rotation in one direction in relation to the transmission case, and the rotation that is input through the brake B-2 is stationary. The ring gear R2 is connected to a counter gear 11, and the counter gear 11 is connected to a drive wheel through a counter shaft and a differential device not shown in the drawing.

Figure 3:
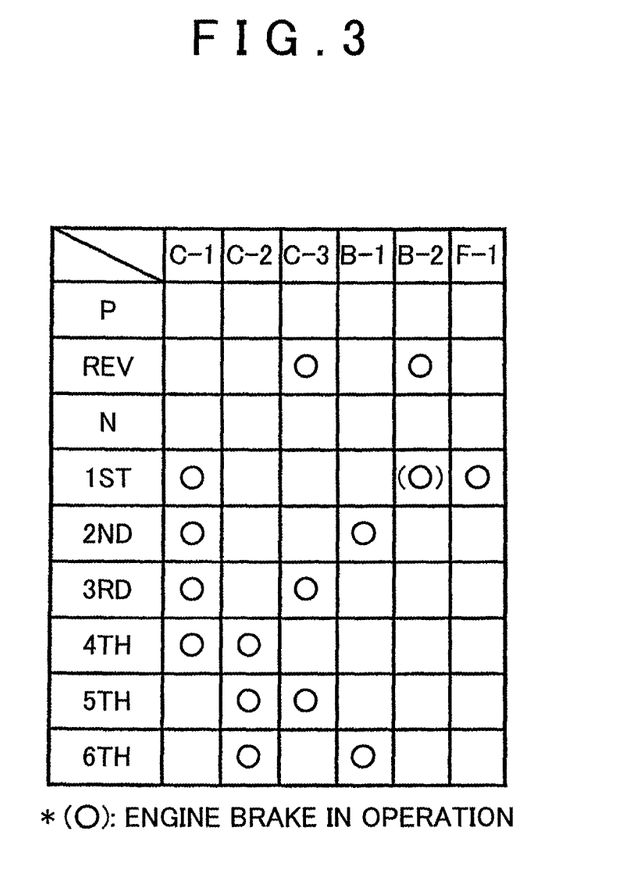
FIG. 3 is an engagement chart for the automatic transmission to which the present invention is applicable.

The automatic transmission 3 with the above configuration forms shift speed gear ratios with good step ratios by operating the clutches C-1 to C-3, the brakes B-1 and B-2, and the one-way clutch F-1 in first to sixth forward speeds and one reverse speed as shown by an operation chart in FIG. 3. Various shift controls are executed by variously engaging pairs of elements among the plurality of clutches C-1 to C3 and brakes B1 and B2. Excluding driving in the first forward speed (e.g. at start off), two elements among the clutches C-1 to C-3 and the brakes B-1 and B-2 are engaged for each shift speed to achieve the shift speeds.

A control system 1 of an automatic transmission according to the present invention, and the structure of a clutch C-1 and an oil passage thereof, will be described next with reference to FIGS. 1 and 4.

Figure 1:
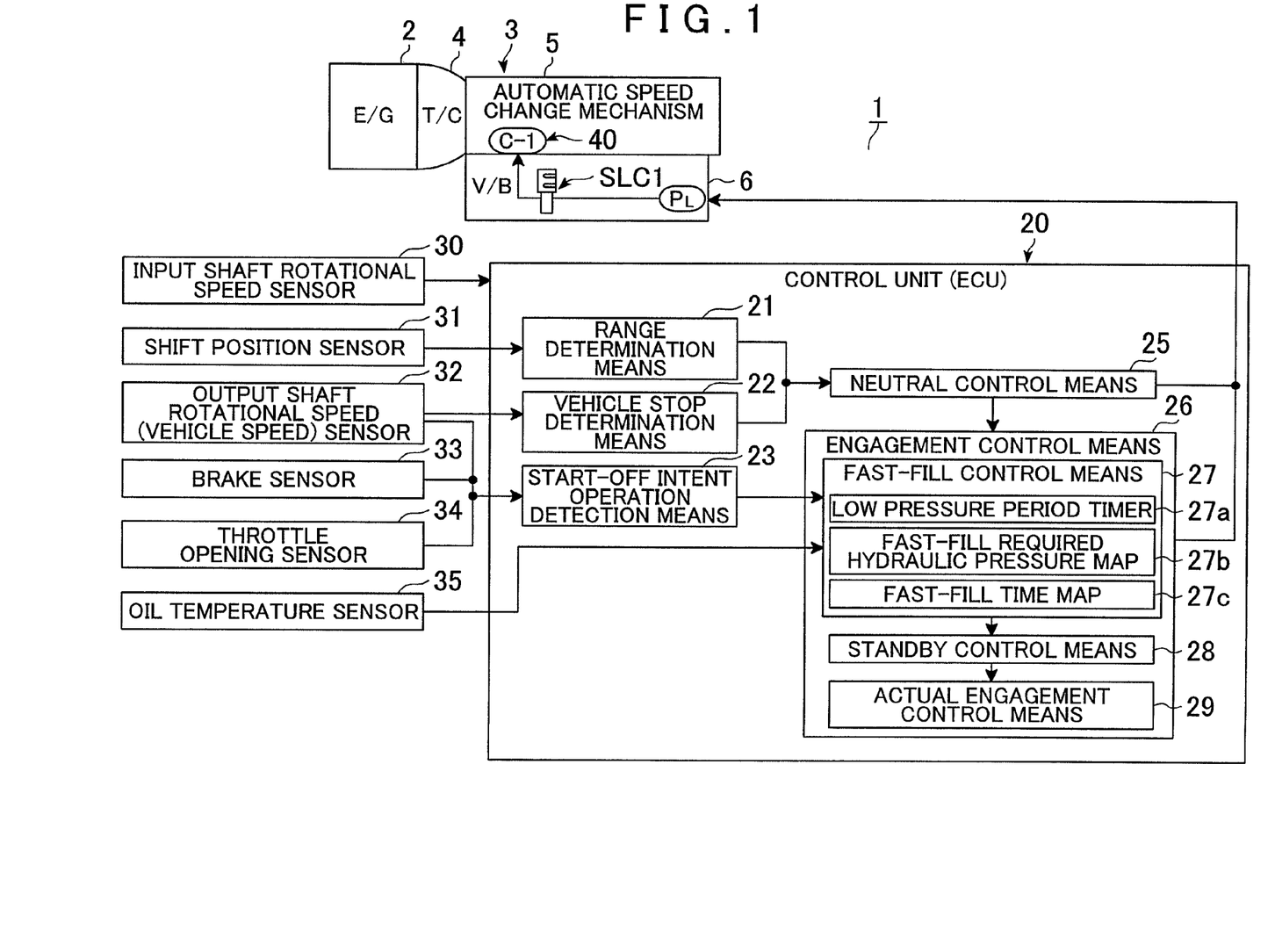
FIG. 1 is a block diagram that shows a control device of an automatic transmission according to the present invention.
Figure 2:
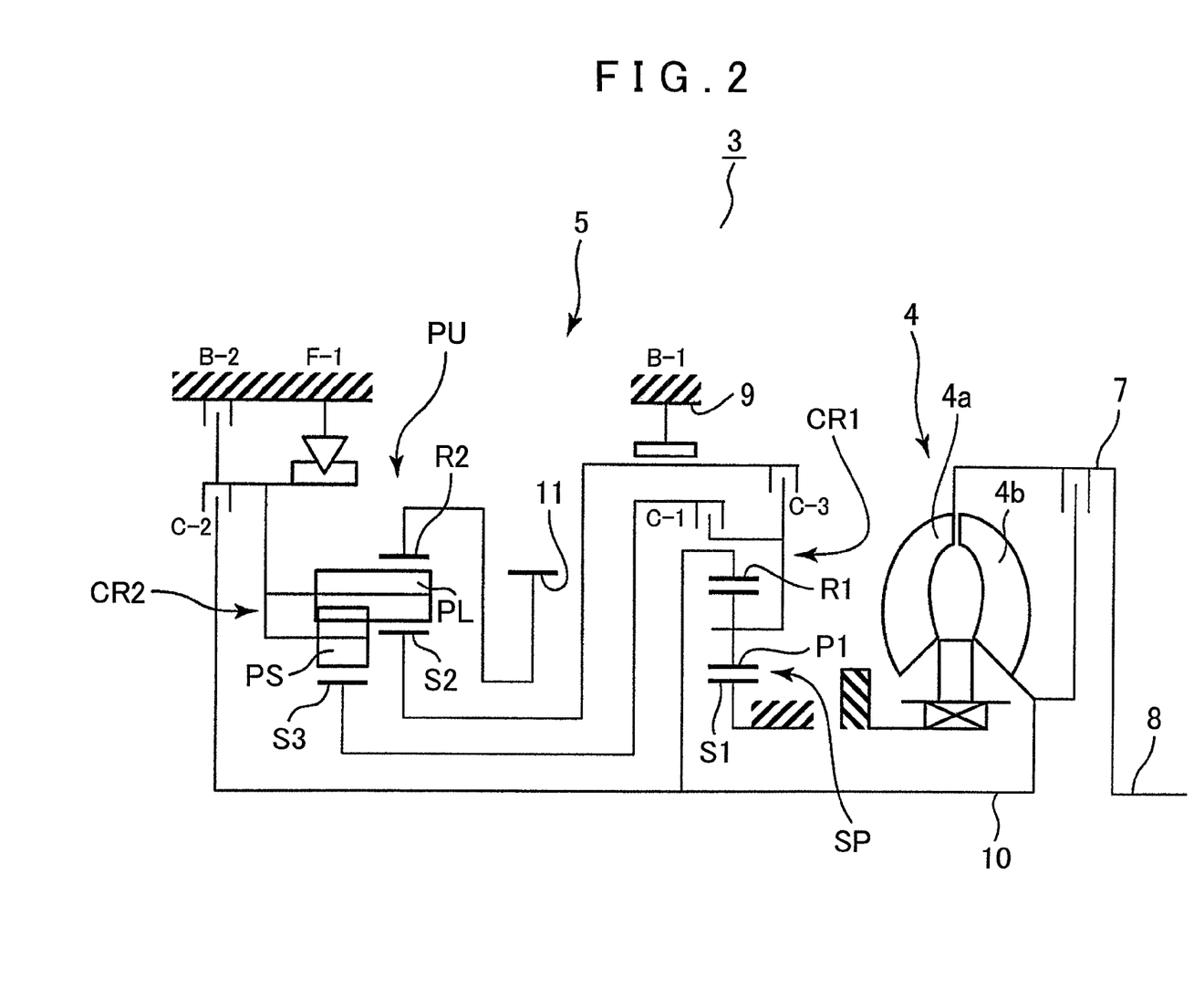
FIG. 2 is a skeleton diagram that shows an automatic transmission to which the present invention is applicable.

As FIG. 1 illustrates, the present control device 1 of an automatic transmission has a control unit (ECU) 20. The control unit 20 is connected to an input shaft rotational speed sensor 30, a shift position sensor 31, an output shaft rotational speed (vehicle speed) sensor 32, a brake sensor 33, a throttle opening sensor 34, an oil temperature sensor (oil temperature detection means) 35, and the like. The control unit 20 is also connected to a hydraulic control device (V/B) 6 that hydraulically controls the clutches C-1 to C-3, the brakes B1 and B2 and the lock-up clutch 7 of the automatic transmission 5 described above, and the like.

The hydraulic control device 6 includes a plurality of linear solenoid valves that control engagement pressures delivered to hydraulic servos of the clutches C-1 to C-3 and the brakes B-1 and B-2. In particular, the hydraulic control device 6 includes a linear solenoid valve SLC1 that, using a line pressure $P_L$ as the original pressure, can adjust and output an engagement pressure $P_{C1}$ that is delivered to a hydraulic servo 40 of the clutch C-1. The linear solenoid valve SLC1 is configured so as to be controlled by a command from the control unit 20.

Figure 4:
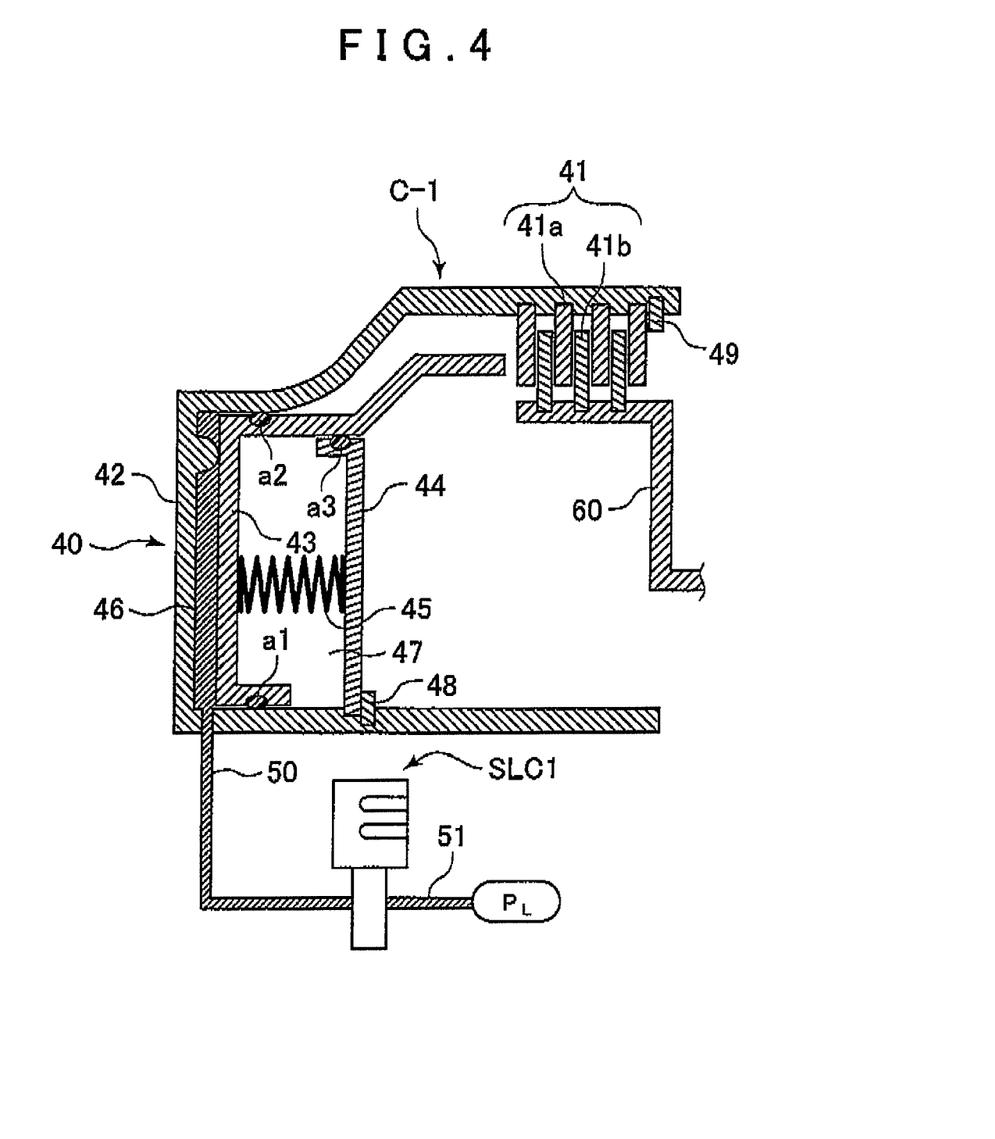
FIG. 4 is a schematic cross-sectional view that shows the structure of a clutch C-1 and an oil passage thereof in the automatic transmission.

Specifically, as illustrated in FIG. 4, the clutch C-1 includes a friction plate 41 formed from outer friction plates 41a and inner friction plates 41b, and a hydraulic servo 40 that connects and disconnects the friction plate 41. The hydraulic servo 40 has a clutch drum 42, a piston member 43, a return plate 44, and a return spring 45, whereby a hydraulic oil chamber 46 and a cancel oil chamber 47 are formed.

The clutch drum 42 is rotatably supported by the input shaft 10, which is not shown in FIG. 4, and the clutch drum 42 is drive-coupled to the sun gear S3 through a connection member not shown in the drawing. An inner circumferential surface on an outer circumferential end portion of the clutch drum 42 is in spline engagement with the outer friction plates 41a, and the axial movement of the outer friction plates 41a with respect to the clutch drum 42 is restricted by a snap ring 49. The inner friction plates 41b, which are alternately disposed between the outer friction plates 41a in the axial direction, are in spline engagement with an outer circumferential surface of an end portion of a hub member 60, and the hub member 60 is drive-coupled to the carrier CR1.

The piston member 43 is accommodated within the clutch drum 42 and disposed axially movable. The hydraulic oil chamber 46 is formed between the piston member 43 and the clutch drum 42 using two seal rings a1, a2. Further, the axial movement of the return plate 44 is prevented by a snap ring 48 that is fitted to the clutch drum 42. The return spring 45 is provided in a contracted state between the return plate 44 and the piston member 43, and the cancel oil chamber 47 is formed using a seal ring a3.

The hydraulic oil chamber 46 is connected to an output port of the linear solenoid valve SLC1 through an oil passage 50, and the line pressure $P_L$ is input to an input port of the linear solenoid valve SLC1 through an oil passage 51. Note that the linear solenoid valve SLC1 is disposed within the hydraulic control device 6. Further, the "oil passage 50" in the present specification refers to an oil passage that communicates the output port of the linear solenoid valve SLC1 formed within the hydraulic control device 6 with the hydraulic oil chamber 46, and passes through each of, for example, inside the hydraulic control device 6, inside an oil pump case (not shown), and inside the input shaft 10.

In the clutch C-1 thus configured, for example, during a state in which the engagement pressure $P_{C1}$ is not output from the linear solenoid valve SLC1 (while the clutch C-1 is in a disengaged state), the oil passage 50 and the hydraulic oil chamber 46 are drained (opened to air), and a mixed-air state based on the length of time the disengaged state lasts and the like is reached.

During the neutral control, as described in detail later, if a predetermined pressure $P_{C1\text{-}LOW}$ is output as the engagement pressure $P_{C1}$ from the linear solenoid valve SLC1, a state is achieved in which the biasing force of the spring 45 presses the piston member 43 against the clutch drum 42. And in this state of contact, a state is also achieved in which the oil passage 50 and the hydraulic oil chamber 46 are filled with oil.

Next, when a stroke end pressure $P_{C1\text{-}STEND}$ is output as the engagement pressure $P_{C1}$ from the linear solenoid valve SLC1, the piston member 43 overcomes the biasing force of the spring 45 and moves so as to contract the spring 45. A state is thus achieved in which an end of the piston member 43 contacts the friction plate 41 (the hydraulic servo 40 attains a so-called reduced-play state).

If an engagement pressure $P_{C1}$ greater than the stroke end pressure $P_{C1\text{-}STEND}$ is output from the linear solenoid valve SLC1, the piston member 43 moves further such that the end of the piston member 43 presses the friction plate 41 and causes engagement of the clutch C-1.

The configuration of the control unit (ECU) 20 in the control device 1 of the automatic transmission will be described next. As illustrated in FIG. 1, the control unit 20 includes range determination means 21, vehicle stop determination means 22, start-off intent operation detection means 23, neutral control means 25, and engagement control means 26. The engagement control means 26 includes fast-fill control means 27 that has a low pressure period timer 27a, a fast-fill required hydraulic pressure map 27b, and a fast-fill time map 27c; standby control means 28; and actual engagement control means 29. Among the above, the neutral control means 25 and the engagement control means 26 command and control the linear solenoid valve SLC1, and can control a hydraulic pressure command value for the engagement pressure $P_{C1}$. The neutral control means 25 and the engagement control means 26 can also control engaged and disengaged states of the clutch C-1, that is, from a stroke state of a piston of the hydraulic servo 40 to a pressed state of the friction plate.

The input shaft rotational speed sensor 30 detects a rotational speed of the input shaft 10 of the automatic speed change mechanism 5 (that is, a turbine speed Nt of the turbine runner 4b). The shift position sensor 31 detects an operation position of a shift lever (or a position of a manual shaft coupled with the shift lever) that is disposed near a driver seat not shown in the drawing. The output shaft rotational speed sensor 32 detects a rotational speed of the counter gear 11 (or counter shaft) of the automatic speed change mechanism 5 (that is, a vehicle speed V and an output shaft rotational speed Nout). The brake sensor 33 detects a depression state (at least a brake on/off state) of a brake pedal not shown in the drawing. The throttle opening sensor 34 detects a throttle opening that is mainly controlled based on an accelerator operation amount. The oil temperature sensor 35 detects an oil temperature within the automatic transmission 3.

The range determination means 21, based on the detection of the shift lever position by the shift position sensor 31, determines which range is being used out of shift ranges that include a Park (P) range (non-driving range), a Reverse (R) range (driving range), a Neutral (N) range (non-driving range), and a Drive (D) range (driving range). The vehicle stop determination means 22 determines whether the vehicle is in a stopped state based on a result of the output shaft rotational speed sensor 32 detecting the output shaft rotational speed (i.e., the vehicle speed V). The start-off intent operation detection means 23 detects that the driver is performing an operation with the intent of starting off if the driver gently lets off the brake on a sloped road or the like and the vehicle speed V becomes greater than zero (the vehicle is no longer in a stopped state), if the brake is turned off, or if the throttle opening is opened (the throttle opening is no longer 0%).

Figure 5:
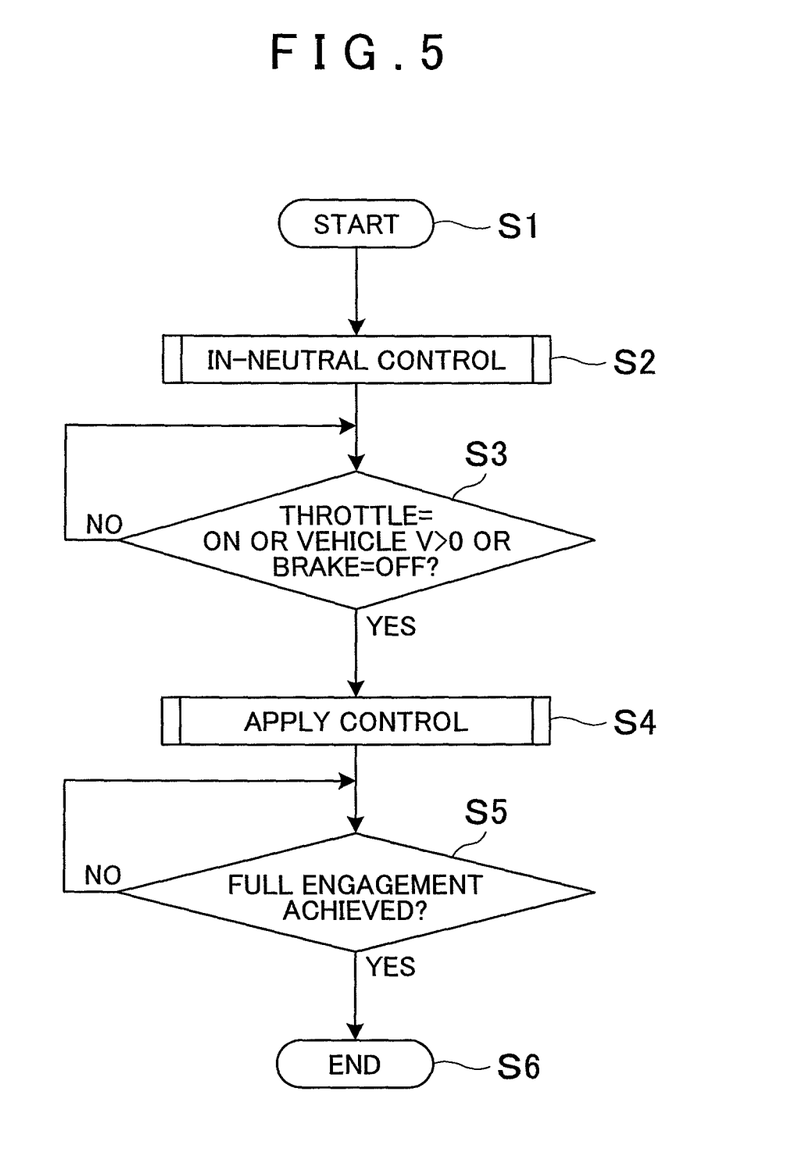
FIG. 5 is a flowchart that shows a neutral control according to the present invention.
Figure 6:
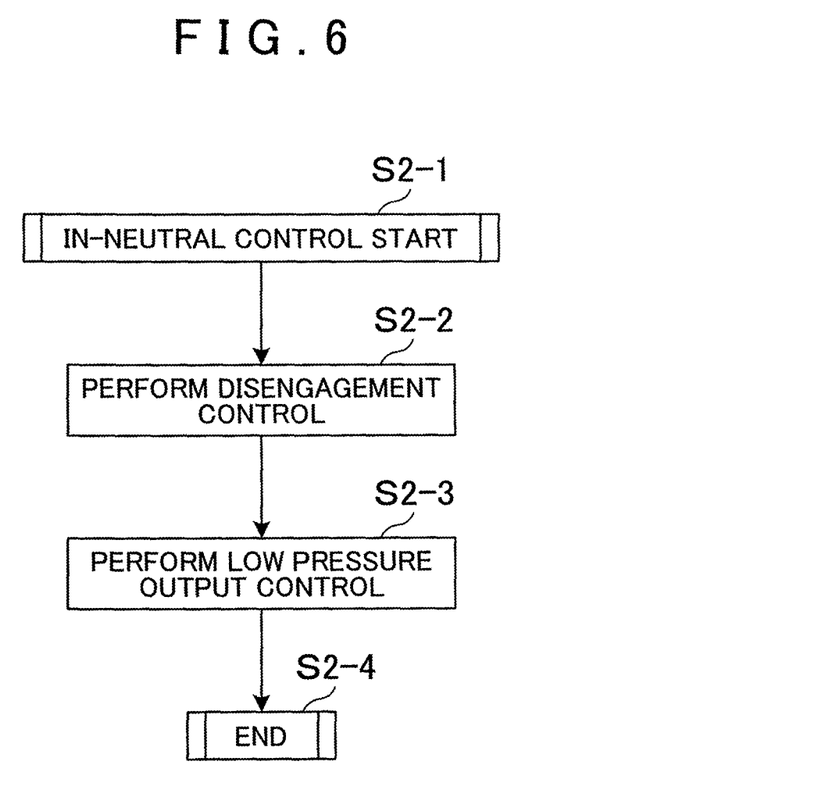
FIG. 6 is a flowchart that shows an in-neutral control.

A clutch C-1 control during a vehicle stop, that is, a neutral control performed by the neutral control means 25 and an apply control performed by the engagement control means 26, will be described next based on FIGS. 5 to 8 and with reference to FIG. 1 as well. For example, as illustrated in FIG. 5, if it is determined by the vehicle stop determination means 22 that the vehicle is stopped with the range determination means 21 also determining that the D range is in use, a clutch C-1 control according to the present invention is initiated (S1), and the neutral control means 25 initiates an in-neutral control (S2). As illustrated in FIG. 6, once the in-neutral control is initiated (S2-1), the neutral control means 25 first performs a clutch C-1 disengagement control (S2-2). In the disengagement control, for example, the engagement pressure $P_{C1}$ is lowered at a preset sharp gradient to a hydraulic pressure immediately prior to disengagement of the clutch C-1 that is calculated in advance. The clutch C-1 is then gently disengaged by lowering the engagement pressure $P_{C1}$ for a predetermined period at a gentle gradient.

After the disengagement control (S2-2) ends, the neutral control means 25 transitions to a low pressure output control (S2-3) and commands and controls the linear solenoid valve SLC1. The neutral control means 25 controls the linear solenoid SLC1 by setting a hydraulic pressure command value such that the engagement pressure $P_{C1}$ of the clutch C-1 becomes a predetermined pressure $P_{C1-LOW}$, which is lower than a stroke end pressure $P_{C1-STEND}$ at which the piston of the hydraulic servo 40 of the clutch C-1 reaches a stroke end (that is, at which the hydraulic servo 40 attains a reduced-play state).

Thus, in the hydraulic servo 40 of the clutch C-1 as described above, a control is performed to achieve a state in which the piston member 43 contacts the clutch drum 42 by the biasing force of the spring 45, and a state in which oil fills the oil passage 50 from the linear solenoid valve SLC1 to the hydraulic oil chamber 46 and fills the hydraulic oil chamber 46 (see FIG. 4). Thus, the clutch C-1 is not in a drag state, and is in a disengaged state but not a state of full disengagement (that is, the hydraulic pressure is not zero). Consequently, while the vehicle is stopped in the D range, the clutch C-1 can be disengaged without drag, which eliminates drag loss in the clutch C-1. This also allows the engine 2 to have a lower idling rotational speed and lower output.

After the neutral control means 25 performs the low pressure output control, the routine proceeds to S3 shown in FIG. 5 via S2-4. Accordingly, the start-off intent operation detection means 23 stands by until any of the following are detected: the throttle opening sensor 34 detects that the throttle is turned on, or the output shaft rotational speed (vehicle speed) sensor 32 detects that the vehicle speed V is greater than zero, or the brake sensor 33 detects that the brake is turned off (S3: No). If any of the states of throttle=ON, vehicle speed V>0, or brake=OFF are detected (S3: Yes), the start-off intent operation detection means 23 determines that the neutral control (i.e., the low pressure output control) is ended as the driver intends to start off, and the routine proceeds to S4. Note that a time from the start of the low pressure output control (S2-3) to its end (S3: Yes), that is, a time TA (see FIG. 9) that the hydraulic pressure command value is maintained so as to sustain the predetermined pressure $P_{C1-LOW}$, is kept by the low pressure period timer 27a, and reflected in a fast-fill control performed by the fast-fill control means 27 that will be described in more detail later.

Figure 7:
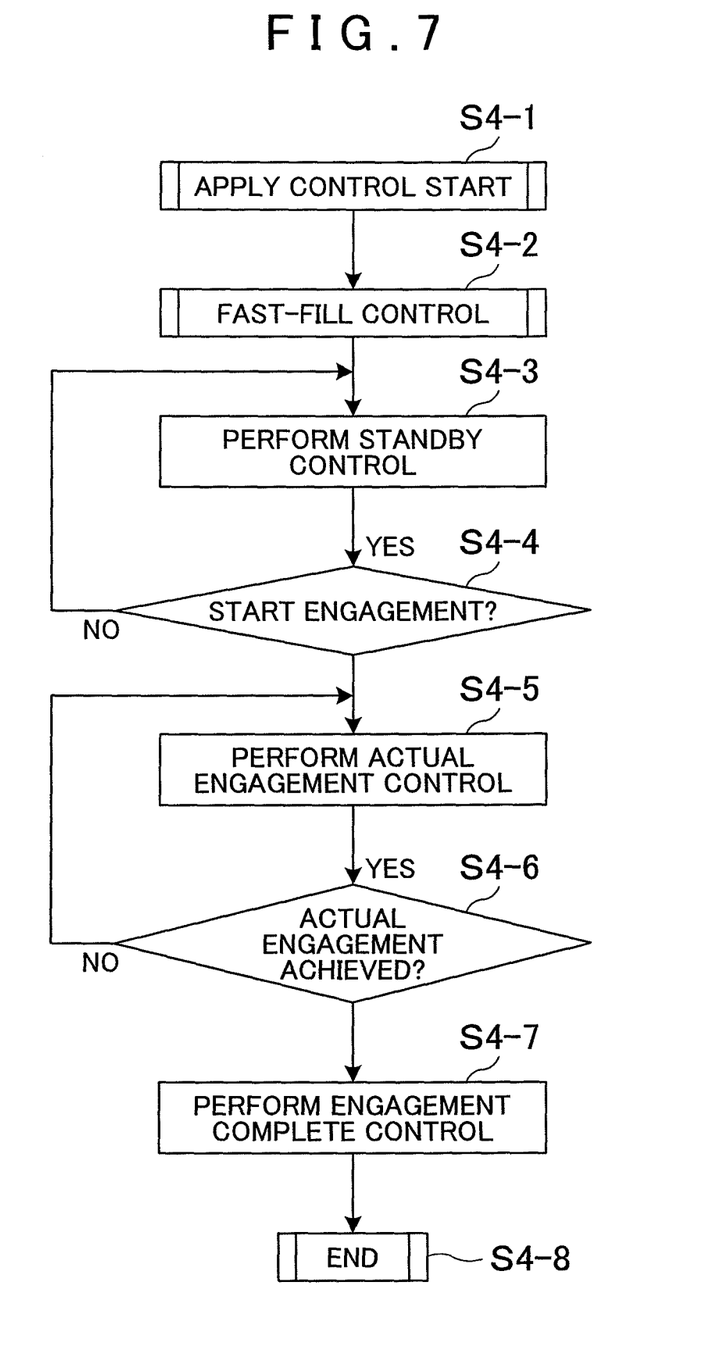
FIG. 7 is a flowchart that shows an apply control.
Figure 8:
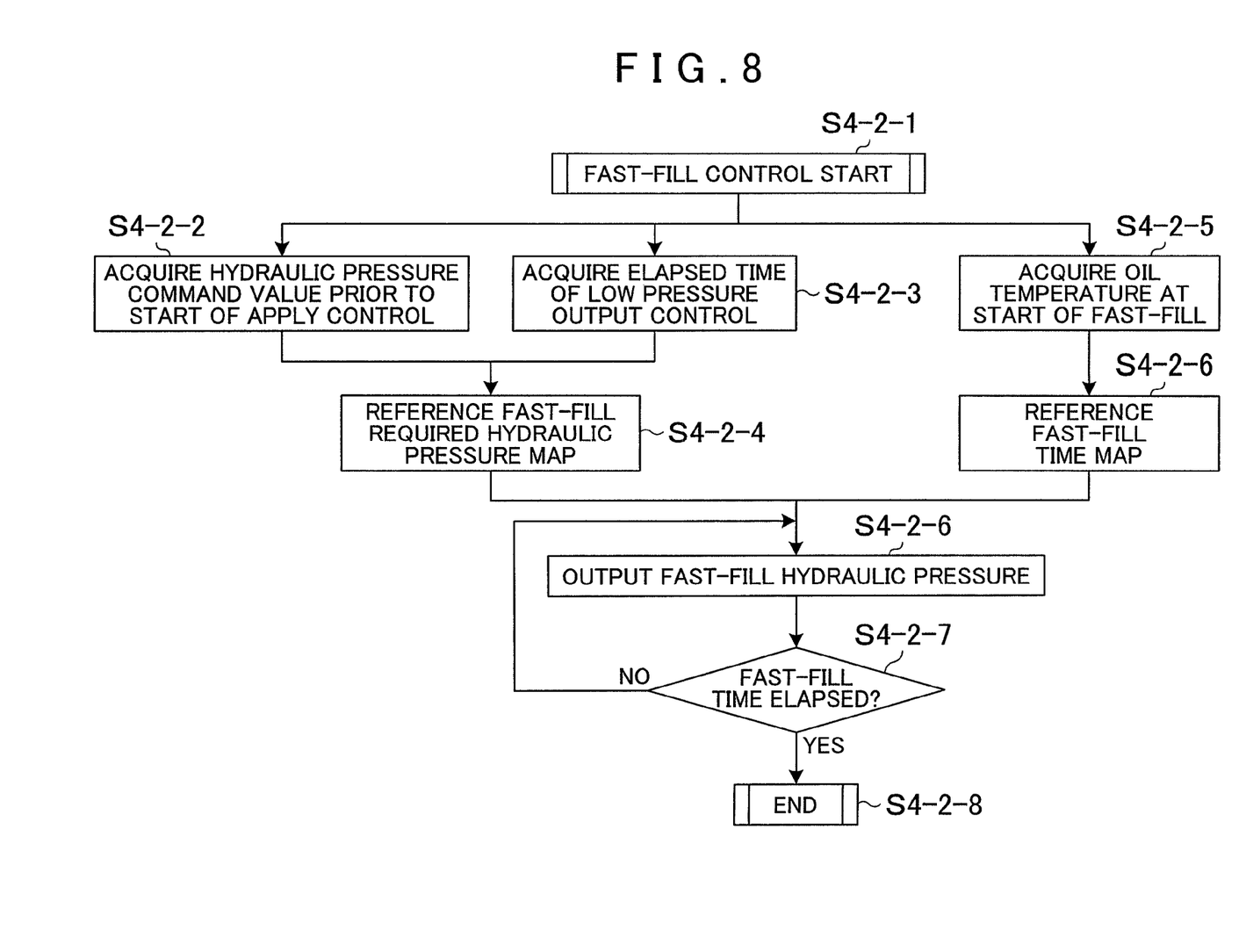
FIG. 8 is a flowchart that shows a fast-fill control.

Proceeding to S4, the engagement control means 26 initiates the apply control as shown in FIG. 7 (S4-1). First, the fast-fill control means 27 starts execution of the fast-fill control in order to perform a play reducing operation for the hydraulic servo 40 of the clutch C-1 (S4-2). More specifically, as illustrated in FIG. 8, after initiating the fast-fill control (S4-2-1), a hydraulic pressure command value for the engagement pressure $P_{C1}$ (i.e., the predetermined pressure $P_{C1-LOW}$) prior to the start of the apply control (after the low pressure output control is ended) is acquired (S4-2-2). The elapsed time (time that the hydraulic pressure command value is maintained to sustain the predetermined pressure $P_{C1-LOW}$) TA for the low pressure output control as kept by the low pressure period timer 27a is then acquired (S4-2-3). Next, based on the acquired hydraulic pressure command value prior to the start of the apply control and the elapsed time for the low pressure output control, the fast-fill control means 27 refers to the fast-fill required hydraulic pressure map 27b (S4-2-4), and sets a hydraulic pressure command value $P_{C1-FF}$ for the engagement pressure $P_{C1}$ to be instructed in the fast-fill control.

Note that, although not shown in detail in the drawings, the fast-fill required hydraulic pressure map 27b stores values (hydraulic pressure command values $P_{C1-FF}$) for the engagement pressure in the fast-fill control based on the relationship between the hydraulic pressure command value prior to the start of the apply control and the elapsed time for the low pressure output control as empirically calculated time values. Specifically, the fast-fill required hydraulic pressure map 27b accurately predicts the position of the piston (not shown) of the hydraulic servo 40 that moves slightly in relation to the elapsed time and the output hydraulic pressure command value of the low pressure output control, and stores the hydraulic pressure command values $P_{C1-FF}$ for the engagement pressure $P_{C1}$ that are required to operate the piston to reduce play in the fast-fill control.

In other words, during the low pressure output control, even if the hydraulic pressure command value for the engagement pressure $P_{C1}$ of the clutch C-1 is maintained at the predetermined pressure $P_{C1-LOW}$, it takes time for the actual engagement pressure $P_{C1}$ to converge on the predetermined pressure $P_{C1-LOW}$ serving as the hydraulic pressure command value. Therefore, the stroke position of the piston in the hydraulic servo 40 of the clutch C-1 should vary depending on the length of time the predetermined pressure $P_{C1-LOW}$ serving as the hydraulic pressure command value is instructed. The low pressure period timer 27a thus measures the time TA that the low pressure output control is continued. And, based on the value of the predetermined pressure $P_{C1-LOW}$ instructed by the low pressure output control and the time TA that the predetermined pressure $P_{C1-LOW}$ is continued, the fast-fill required hydraulic pressure map 27b is referenced. This makes it possible to set the hydraulic pressure command value $P_{C1-FF}$ for the engagement pressure $P_{C1}$ in the fast-fill control based on the predetermined pressure $P_{C1-LOW}$ and the time TA, in the form of predicting the stroke position of the piston in the hydraulic servo 40 of the clutch C-1.

Meanwhile, concurrent with S4-2-2 to S4-2-4, the fast-fill control means 27 through a detection made by the oil temperature sensor 35 acquires an oil temperature at the start of the fast-fill control (S4-2-5). The fast-fill control means 27 then refers to the fast-fill time map 27c (S4-2-6), and sets a time for outputting the hydraulic pressure command value $P_{C1-FF}$ in the fast-fill control, that is, a time for executing the fast-fill control (also referred to as a "fast-fill time TB" below).

In other words, although not shown in detail in the drawings, the fast-fill time map 27c stores relationships between the oil temperature and the fast-fill time TB as empirically calculated time values. Specifically, the fast-fill time map 27c stores values for the time TB required to accurately operate the piston to reduce play with the hydraulic pressure command value $P_{C1-FF}$, that is, values for the time TB that are shorter for a higher oil temperature and longer for a lower oil temperature, based on an oil viscosity coefficient dependent on oil temperature. Thus, a more accurate play reducing operation can be executed in conjunction with setting the hydraulic pressure command value $P_{C1-FF}$ for the engagement pressure $P_{C1}$ in the fast-fill control and setting the time TB for executing the fast-fill control.

As described above, the fast-fill control means 27 sets the hydraulic pressure command value $P_{C1-FF}$ for the engagement pressure $P_{C1}$ in the fast-fill control and sets the fast-fill time TB, after which the fast-fill control means 27 proceeds to S4-2-6 and outputs the hydraulic pressure command value $P_{C1-FF}$ for the engagement pressure $P_{C1}$ in the fast-fill control. Next, the fast-fill control means 27 determines whether the fast-fill time TB has elapsed (S4-2-7), and until the fast-fill time TB has elapsed (S4-2-7: No) continues the fast-fill control. Once the fast-fill time TB has elapsed (S4-2-7: Yes), the fast-fill operation (play reducing operation) should have ended with the piston in the hydraulic servo 40 of the clutch C-1 slightly more toward the engagement side than at the stroke end (i.e., the clutch C-1 in a drag state). The fast-fill control means 27 thus ends the fast-fill control (S4-2-8), and the routine proceeds to S4-3 in FIG. 7.

Proceeding to S4-3, the standby control means 28 initiates a standby control that maintains the hydraulic pressure command value for the engagement pressure $P_{C1}$ at a standby pressure $P_{C1-W}$ that is higher than the stroke end pressure $P_{C1-STEND}$. Thus, the clutch C-1 is stroked from the drag state so that the piston gradually moves toward the engagement side. Then, it is determined whether engagement of the clutch C-1 has started (that is, whether the clutch C-1 has made a transition to a slip state) based on whether the turbine rotational speed Nt detected by the input shaft rotational speed sensor 30 changes (S4-4). The standby pressure is maintained until engagement of the clutch C-1 is started (S4-4: No). Once engagement of the clutch C-1 is started (S4-4: Yes), the standby control means 28 ends the standby control, and the routine proceeds to S4-5.

Note that the standby pressure $P_{C1-W}$ may be corrected by learning and set based on an engagement timing of a previous clutch C-1 engagement control (or an engagement control during normal shifting). In addition, a time limit is preferably provided such that, if the start of engagement of the clutch C-1 is still not detected even after the standby control has continued for a predetermined time or longer, a transition is forcibly made to an actual engagement control that will be described later, whereby an engagement delay of the clutch C-1 is preferably avoided.

Proceeding to S4-5, the actual engagement control means 29 sets the hydraulic pressure command values for the engagement pressure $P_{C1}$ at an increasing gradient. This increasing gradient is selected from the sharpest of three calculated gradients, e.g. a gradient that safeguards an increase in a torque capacity of the clutch C-1, a preset basic gradient, and a gradient that based on the turbine rotational speed Nt and the output shaft rotational speed Nout safeguards an increase in a rotation change rate. Then, it is determined whether actual engagement of the clutch C-1 has finished on the basis of whether the rotation change rate based on the turbine rotational speed Nt and the output shaft rotational speed Nout (that is, a gear ratio advance ratio) corresponds to a predetermined change rate (S4-6). The increasing gradient is maintained until actual engagement of the clutch C-1 is finished (S4-6: No). Once engagement of the clutch C-1 is finished (S4-6: Yes), the actual engagement control means 29 ends the actual engagement control, and the routine proceeds to S4-7.

Proceeding to S4-7, the engagement control means 26 executes an engagement complete control and sharply increases the engagement pressure $P_{C1}$. The engagement control means 26 increases the engagement pressure $P_{C1}$ until it corresponds to the line pressure $P_L$ and ends the apply control (S4-8). The routine stands by until the engagement control means 26 ends a full engagement control of the clutch C-1 (S5 in FIG. 5: No). Once full engagement of the clutch C-1 is complete (S5: Yes), the entire clutch C-1 control during a vehicle stop as described above is ended (S6).

Figure 9:
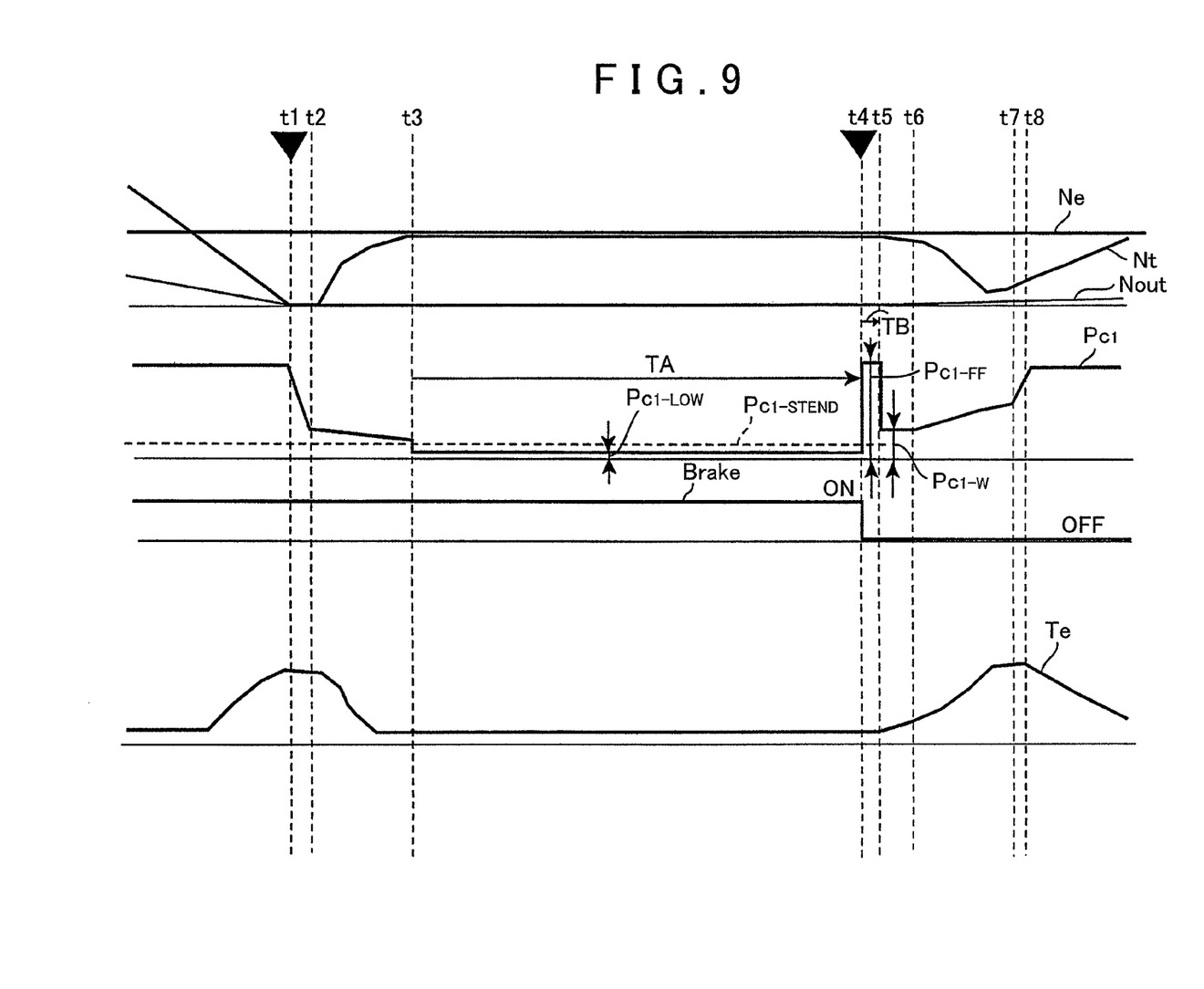
FIG. 9 is a time chart that shows an example of the neutral control according to the present invention.

Next, the clutch C-1 control during a vehicle stop will be described using the driving example in FIG. 9. If the foot brake (Brake) is turned on while the vehicle travels in the D range, the output shaft rotational speed Nout (vehicle speed V) and the turbine rotational speed Nt both start to fall and become zero at a time t1. In other words, the vehicle stops. Consequently, because the range determination means 21 determines that the shift range used is the D range and the vehicle stop determination means 22 determines that the vehicle is stopped, the neutral control means 25 initiates the disengagement control in the in-neutral control (S2-2). The hydraulic pressure command value for the engagement pressure $P_{C1}$ is lowered at a sharp gradient until a time t2 to put the clutch C-1 in a state immediately prior to disengagement, and the clutch C-1 is then gently disengaged by lowering the hydraulic pressure command value for the engagement pressure $P_{C1}$ at a gentle gradient from the time t2 until a time t3.

Thus, the clutch C-1 is disengaged up to the drag state and power transmission between the input shaft 10 of the automatic speed change mechanism 5 and the counter gear 11 (i.e., the drive wheel) is cut off. Further, the input shaft 10 and the turbine runner 4b are in a state of generally free rotation, and the turbine rotational speed Nt increases to substantially match the engine rotational speed Ne due to the fluid transmission of the torque converter 4. If, prior to disengagement of the clutch C-1, engagement of the clutch C-1 causes the input shaft 10 and the turbine runner 4b to drag and fall below an idling rotation of the engine 2, a level of engine torque Te that causes the torque converter 4 to idle, i.e., a level of engine torque Te to prevent the engine from stalling, must be output. However, by disengaging the clutch C-1 and allowing the input shaft 10 and the turbine runner 4b to remain in a state of generally free rotation, the engine torque Te can be lowered accordingly.

At the time t3, when the disengagement control is ended, the neutral control means 25 initiates the low pressure output control (S2-3), and sets the hydraulic pressure command value for the engagement pressure $P_{C1}$ to the predetermined pressure $P_{C1-LOW}$ that is lower than the stroke end pressure $P_{C1-STEND}$. Thus, drag loss in the clutch C-1 during the neutral control can be eliminated, and a disengagement state identical to neutral can be attained. The same fuel economy as when, for example, a manual shift to the neutral range is made can be achieved, and better fuel economy compared to past neutral controls that set the clutch C-1 in a drag state can also be realized.

At a time t4, if the start-off intent operation detection means 23 detects any of the states of throttle=ON, vehicle speed V>0, or brake=OFF (S3: Yes), the start-off intent operation detection means 23 ends the low pressure output control as the driver intends to start off, and the fast-fill control means 27 initiates the fast-fill control in the apply control (S4-2).

As described above, during the low pressure output control, even if the hydraulic pressure command value for the engagement pressure $P_{C1}$ of the clutch C-1 is maintained at the predetermined pressure $P_{C1\text{-}LOW}$, it takes time for the actual engagement pressure $P_{C1}$ to converge on the predetermined pressure $P_{C1\text{-}LOW}$ serving as the hydraulic pressure command value. Therefore, the stroke position of the piston in the hydraulic servo 40 of the clutch C-1 varies depending on the length of time the predetermined pressure $P_{C1\text{-}LOW}$ serving as the hydraulic pressure command value is instructed.

The low pressure period timer 27a thus measures the time TA that the low pressure output control is continued, and based on the value of the predetermined pressure $P_{C1\text{-}LOW}$ instructed by the low pressure output control and the time TA that the predetermined pressure $P_{C1\text{-}LOW}$ is continued, the fast-fill required hydraulic pressure map 27b is referenced (S4-2-2 to S4-2-4). In other words, the hydraulic pressure command value $P_{C1\text{-}FF}$ for the engagement pressure $P_{C1}$ in the fast-fill control is set based on the predetermined pressure $P_{C1\text{-}LOW}$ and the time TA, in the form of predicting the stroke position of the piston in the hydraulic servo 40 of the clutch C-1.

In addition, even if the hydraulic pressure command value $P_{C1\text{-}FF}$ for the engagement pressure $P_{C1}$ is accurately set in the fast-fill control based on the predicted stroke position as described above, oil viscosity differs depending on the oil temperature and results in different times until the actual engagement pressure $P_{C1}$ converges on the hydraulic pressure command value $P_{C1\text{-}FF}$. Thus, the fast-fill control means 27 refers to the fast-fill time map 27c in which the relationship between the oil temperature and the time TB for hydraulic pressure instruction is recorded, and sets the time TB for outputting (executing) the hydraulic pressure command value $P_{C1\text{-}FF}$ (S4-2-5 to S4-2-6).

By performing the fast-fill control that sets the hydraulic pressure command value $P_{C1\text{-}FF}$ for the engagement pressure $P_{C1}$ and the time TB for outputting the hydraulic pressure command value $P_{C1\text{-}FF}$, the play reducing operation can be quickly and accurately performed to set the clutch C-1 in a state immediately prior to engagement (a drag state that is immediately prior to the slip state). This also makes it possible to suppress engagement shock and engagement delay when the vehicle starts off.

After the time TB starting at the time t4 elapses at a time t5, the fast-fill control is ended (S4-2-7: Yes), and the standby control means 28 initiates the standby control that sets the engagement pressure $P_{C1}$ to the standby pressure $P_{C1\text{-}W}$ (S4-3). The clutch C-1 is thus gradually engaged and transitions from the drag state to the slip state, in other words, torque transmission through the clutch C-1 is started.

Subsequently at a time t6, if it is determined through the standby control that a change in the turbine rotational speed Nt has been detected and engagement of the clutch C-1 started (S4-4: Yes), the actual engagement control means 29 calculates three gradients, e.g. a gradient that safeguards an increase in the torque capacity of the clutch C-1, a preset basic gradient, and a gradient that based on the turbine rotational speed Nt and the output shaft rotational speed Nout safeguards an increase in the rotation change rate. The actual engagement control means 29 then selects the sharpest gradient among these three, and sets the hydraulic pressure command value for the engagement pressure $P_{C1}$ at the selected gradient (S4-5).

Thus, from the time t6 to a time t7, the clutch C-1 gradually engages to transition from the slip state toward a state of full engagement. Accordingly, the output shaft rotational speed Nout (vehicle speed V) increases as engagement of the clutch C-1 advances, and the turbine rotational speed Nt decreases as the gear ratio of the first forward speed is gradually approached. Once the gear ratio of the first forward speed is reached, the turbine rotational speed Nt starts to increase in response to the increase in the output shaft rotational speed Nout. Further, because the turbine rotational speed Nt falls to a rotational speed at which the gear ratio of the first forward speed is achieved, a rotation difference is generated between the idling speeds of the pump impeller 4a and the turbine runner 4b in the torque converter 4, and the engine torque Te increases by an amount that corresponds to the transmission loss caused by the rotation difference.

At the time t7, if it is determined that actual engagement of the clutch C-1 is complete on the basis of the rotation change rate (gear ratio advance rate) that is based on the turbine rotational speed Nt and the output shaft rotational speed Nout (S4-6: Yes), the engagement control means 26 executes the engagement complete control (S4-7), and then sharply increases the engagement pressure $P_{C1}$ until the increased engagement pressure $P_{C1}$ corresponds to the line pressure $P_L$, and ends the apply control (S4-8). After performing the above, control of the clutch C-1 according to the present neutral control is ended, and a normal driving state at the first forward speed is achieved.

As described above, according to the present control device 1 of an automatic transmission, when it is determined that the D range is in use and also determined that the vehicle is stopped, the neutral control means 25 commands and controls such that the engagement pressure $P_{C1}$ is set so as to achieve a state in which the piston 43 of the clutch C-1 contacts the clutch drum 42 by the biasing force of the spring 45, and a state in which oil fills the oil passage 50 from the linear solenoid valve SLC1 to the hydraulic oil chamber 46 and fills the hydraulic oil chamber 46. There is thus no drag loss in the clutch C-1 during a so-called neutral control, and the same fuel economy as when, for example, a manual shift to the neutral range is made can be achieved.

If an operation that indicates the driver's intent to start off the vehicle is detected, the fast-fill control means 27 executes the fast-fill control that temporarily increases the hydraulic pressure command value for the engagement pressure $P_{C1}$, and sets the hydraulic servo 40 of the clutch C-1 more toward the engagement side than at the stroke end. Therefore, coupled with the response of the linear solenoid valve SLC1 to increase the engagement pressure $P_{C1}$, a delay in engagement of the clutch C-1 when the driver performs a start-off operation can be suppressed so that the driver does not experience a sense of incongruity.

In addition, based on the hydraulic pressure command value $P_{C1\text{-}LOW}$ for the engagement pressure $P_{C1}$ that is commanded and controlled by the neutral control means 25 and the time TA that the hydraulic pressure command value $P_{C1\text{-}LOW}$ is maintained, the fast-fill control means 27 sets the magnitude of the hydraulic pressure command value $P_{C1\text{-}FF}$ in the fast-fill control 27. That is, the hydraulic pressure control state of the clutch C-1 (piston stroke state of the hydraulic servo 40) at the end of the neutral control 25 is predicted, and the fast-fill control can be executed in a form that reflects the prediction. It is thus possible to perform a fast-fill control that more accurately sets the clutch C-1 to a state immediately prior to engagement, so that engagement shock and engagement delay can be avoided.

The fast-fill control means 27 sets the time TB for executing the fast-fill control in accordance with the oil temperature. Therefore, a precise fast-fill control that considers oil viscosity can be executed to more accurately set the clutch to a state immediately prior to engagement, thus suppressing engagement shock and engagement delay.

The embodiment described above applies the present control device 1 to an automatic transmission 3 capable of achieving six forward speeds and one reverse speed as an example. However, the present invention is not limited to this and may be applied to any type of automatic transmission, such as a multi-stage automatic transmission, a belt continuously variable transmission, and a toroidal continuously variable transmission, so long as the automatic transmission has a clutch that performs power transmission when engaged at start off and forms a neutral state when disengaged.

In the present embodiment, a neutral control that is performed while the vehicle is stopped in the D range is described. However, the present invention may also be applied such that a neutral control is performed while the vehicle is stopped in the R range, for example.

In the present embodiment, during the fast-fill control, the hydraulic pressure command value $P_{C1\text{-}FF}$ is set according to the hydraulic pressure command value $P_{C1\text{-}LOW}$ at the end of the neutral control and the time TA that the neutral control is continued, and the fast-fill time TB is set based on the oil temperature. However, for example, the hydraulic pressure command value may be a fully-open value (corresponding to the line pressure $P_L$) that is set by adjusting only the fast-fill time TB in accordance with the parameters of the hydraulic pressure command value $P_{C1\text{-}LOW}$ at the end of the neutral control, the time TA that the neutral control is continued, and the oil temperature.

The clutch C-1 disengagement control, as well as the standby control, the actual engagement control and the engagement complete control in the apply control, and other controls are not limited to those in the present embodiment, and various modifications are conceivable.

INDUSTRIAL APPLICABILITY

The hydraulic control device for a start-off system according to the present invention can be used as a control device of an automatic transmission installed in a passenger vehicle, truck, or the like, and is particularly well suited for use as a control device of an automatic transmission that performs a neutral control and aims to improve fuel economy while suppressing a delay in clutch engagement at start off after the neutral control.

DESCRIPTION OF THE REFERENCE NUMERALS

1 CONTROL DEVICE OF AUTOMATIC TRANSMISSION
3 AUTOMATIC TRANSMISSION
21 RANGE DETERMINATION MEANS
22 VEHICLE STOP DETERMINATION MEANS
23 START-OFF INTENT OPERATION DETECTION MEANS
25 NEUTRAL CONTROL MEANS
26 ENGAGEMENT CONTROL MEANS
27 FAST-FILL CONTROL MEANS
35 OIL TEMPERATURE DETECTION MEANS (OIL TEMPERATURE SENSOR)
40 Hydraulic Pressure Servo
C-1 CLUTCH
$P_{C1}$ ENGAGEMENT PRESSURE
$P_{C1\text{-}STEND}$ STROKE END PRESSURE
$P_{C1\text{-}LOW}$ LOW PRESSURE, HYDRAULIC PRESSURE COMMAND VALUE (IN NEUTRAL CONTROL)
$P_{C1\text{-}FF}$ HYDRAULIC PRESSURE COMMAND VALUE (IN FAST-FILL CONTROL)
SLC1 SOLENOID VALVE
TA TIME (ELAPSED TIME OF LOW PRESSURE OUTPUT CONTROL)
TB TIME (FAST-FILL TIME)

The invention claimed is:

1. A control device of an automatic transmission that commands and controls a solenoid valve capable of adjusting and outputting an engagement pressure to be delivered to a hydraulic oil chamber of a hydraulic servo of a clutch that is engaged at start off, the control device comprising:
an electronic control unit, configured with executable programmed logic, to perform:
determining a shift range that includes a driving range based on a detection by a shift position sensor;
determining that a vehicle is stopped based on a detection by an output shaft rotational speed sensor;
executing a neutral control that, when it is determined that the driving range is in use and determined that the vehicle is stopped, commands and controls so that the engagement pressure is maintained a predetermined pressure which is configured to cause, when the clutch is disengaged by the neutral control: a piston of the clutch to contact a clutch drum by a biasing force of a spring, an oil passage from the solenoid valve to the hydraulic oil chamber of the hydraulic servo of the clutch to fill with oil, and the hydraulic oil chamber of the hydraulic servo of the clutch to fill with oil, until an intent to start off the vehicle is detected,
wherein the predetermined pressure is greater than zero and smaller than the biasing force of the spring,
detecting an operation that indicates an intent to start off the vehicle;
executing a fast-fill control that, when the operation that indicates an intent to start off the vehicle is detected, temporarily increases a hydraulic pressure command value for the engagement pressure so as to set the hydraulic servo of the clutch in a state more toward an engagement side than at a stroke end; and
performing an engagement control of the clutch subsequent to the fast-fill control, wherein
a magnitude of the hydraulic pressure command value for the engagement pressure in the fast-fill control is changed, based on the hydraulic pressure command value for the engagement pressure that is commanded and controlled by the neutral control unit and a time that said hydraulic pressure command value is continued.

2. The control device of the automatic transmission according to claim 1, further comprising:
an oil temperature sensor that detects an oil temperature, and wherein
a filling time for executing the fast-fill control is based on the oil temperature.

3. The control device according to claim 1, wherein the automatic transmission has a torque converter, and the starting clutch is a clutch that is engaged in the forward first speed change stage.

\* \* \* \* \*